United States Patent
Gokavarapu et al.

(10) Patent No.: US 11,314,545 B2
(45) Date of Patent: Apr. 26, 2022

(54) PREDICTING TRANSACTION OUTCOME BASED ON ARTIFACTS IN A TRANSACTION PROCESSING ENVIRONMENT

(71) Applicant: International Business Machines Corporation, Armonk, NY (US)

(72) Inventors: Nageswararao V. Gokavarapu, Bangalore (IN); John Kurian, Bangalore (IN); Jithesh Moothoor, Bangalore (IN); Raghavendran Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/774,134

(22) Filed: Jan. 28, 2020

(65) Prior Publication Data

US 2020/0159565 A1    May 21, 2020

Related U.S. Application Data

(62) Division of application No. 15/345,831, filed on Nov. 8, 2016, now Pat. No. 10,585,696.

(51) Int. Cl.
*G06F 9/46* (2006.01)
*G06F 9/50* (2006.01)
(Continued)

(52) U.S. Cl.
CPC .......... *G06F 9/466* (2013.01); *G06F 11/0721* (2013.01); *G06F 11/0757* (2013.01);
(Continued)

(58) Field of Classification Search
CPC .... G06F 9/466; G06F 9/5072; G06F 11/0721; G06F 11/0757; G06F 11/3419; G06F 2201/87
See application file for complete search history.

(56) References Cited

U.S. PATENT DOCUMENTS

| | | |
|---|---|---|
| 5,475,813 A | 12/1995 | Cieslak et al. |
| 6,279,026 B1 * | 8/2001 | Clarke .................... G06F 9/465 709/201 |

(Continued)

OTHER PUBLICATIONS

IBM, "List of IBM Patents or Patent Applications Treated as Related," for U.S. Appl. No. 16/744,134, filed Jan. 28, 2020.

*Primary Examiner* — Lewis A Bullock, Jr.
*Assistant Examiner* — Gilles R Kepnang
(74) *Attorney, Agent, or Firm* — Patterson + Sheridan, LLP

(57) ABSTRACT

Method and apparatus for predicting a transaction's outcome in a transaction processing environment are provided. A transaction request is received by a transaction processing monitor (TPM), where the transaction request comprises a plurality of tags. The TPM identifies historical prior transactions corresponding to the transaction request, and determines a plurality of historical tags associated with those historical transactions. The TPM then determines whether a predicted execution time exceeds the transaction request's timeout, and proceeds accordingly. If the predicted execution time exceeds the timeout value, the transaction is immediately returned as failed. The tags associated with a given transaction request are repeatedly updated as the request traverses the transaction processing system, and the transaction is repeatedly verified to ensure that it can still be completed successfully.

20 Claims, 6 Drawing Sheets

(51) Int. Cl.
*G06F 11/34* (2006.01)
*G06F 11/07* (2006.01)
*G06F 9/48* (2006.01)

(52) U.S. Cl.
CPC .......... *G06F 9/4806* (2013.01); *G06F 9/5038* (2013.01); *G06F 9/5072* (2013.01); *G06F 11/3419* (2013.01); *G06F 2201/87* (2013.01)

(56) References Cited

U.S. PATENT DOCUMENTS

| | | | |
|---|---|---|---|
| 7,219,268 B2 | 5/2007 | Adkisson et al. | |
| 7,730,364 B2 | 6/2010 | Chang et al. | |
| 8,910,290 B2 | 12/2014 | Radhakrishnan et al. | |
| 8,966,487 B1 | 2/2015 | Leonard | |
| 2003/0061367 A1* | 3/2003 | Shah | H04L 47/26 709/230 |
| 2004/0158549 A1 | 8/2004 | Matena et al. | |
| 2005/0076276 A1 | 4/2005 | Rivera et al. | |
| 2007/0129980 A1* | 6/2007 | Barros | G06Q 30/08 705/7.29 |
| 2009/0300027 A1* | 12/2009 | Matsunaga | G06F 16/24565 |
| 2011/0041006 A1* | 2/2011 | Fowler | G06F 9/5072 714/10 |
| 2011/0055376 A1* | 3/2011 | Little | G06F 9/466 709/224 |
| 2011/0106940 A1* | 5/2011 | Chauvin | G06F 11/0757 709/224 |
| 2012/0101802 A1 | 4/2012 | Nonoyama et al. | |
| 2012/0278293 A1 | 11/2012 | Bulkowski et al. | |
| 2013/0036089 A1* | 2/2013 | Lucas | G06F 16/2315 707/615 |
| 2013/0066949 A1 | 3/2013 | Colrain et al. | |
| 2013/0160022 A1* | 6/2013 | Blight | G06F 9/466 718/104 |
| 2013/0311622 A1* | 11/2013 | Das Gupta | G06F 9/466 709/221 |
| 2014/0019403 A1 | 1/2014 | Harrison et al. | |
| 2014/0304798 A1* | 10/2014 | Iyengar | H04L 63/1458 726/11 |
| 2015/0277966 A1* | 10/2015 | Sasaki | G06F 16/2365 707/703 |
| 2015/0319265 A1* | 11/2015 | DeRoo | H04L 67/32 709/217 |
| 2016/0092296 A1 | 3/2016 | Ananthapadmanabh et al. | |
| 2016/0098292 A1* | 4/2016 | Boutin | G06F 9/505 718/104 |
| 2016/0128059 A1* | 5/2016 | Hsu | H04W 4/00 370/336 |
| 2017/0034217 A1 | 2/2017 | Anton et al. | |
| 2017/0171253 A1* | 6/2017 | Pierce | H04L 65/1059 |
| 2017/0223768 A1* | 8/2017 | Jain | H04L 1/1887 |
| 2018/0129528 A1 | 5/2018 | Gokavarapu et al. | |

\* cited by examiner

PREDICTING TRANSACTION OUTCOME BASED ON ARTIFACTS IN A TRANSACTION PROCESSING ENVIRONMENT

CROSS-REFERENCE TO RELATED APPLICATIONS

This application is a divisional of co-pending U.S. patent application Ser. No. 15/345,831, filed on Nov. 8, 2016. The aforementioned related patent application is herein incorporated by reference in their entirety.

BACKGROUND

The present invention relates to transaction processing, and more specifically, to predicting transaction failure in a transaction processing environment.

Transaction processing is a form of computer processing where work is divided into transactions. Typically, transactions are indivisible operations, where the entire transaction must either succeed or fail, and distributed transaction processing generally involves executing a transaction across multiple devices. As the number of devices and resources required to process a transaction increases, the possible failure points likewise increases. Common failure points include network delays while the transaction is traversing the system, dispatcher delays before the transaction can be sent to a particular device for processing, scheduler delays where a transaction processor is overloaded and the transaction sits in an input queue for too long, execution delays where a transaction processor is simply executing slowly, and unavailability of a dependent resource.

Generally, transactions can be associated with an amount of time that the transaction must be processed in and, if the transaction is not processed within the time limit, the transaction is typically aborted. For example, if the transaction suffers delays, e.g., waiting for a resource or TPM to become available, the elapsed time since the transaction was initiated may exceed this timeout. When that happens, the transaction fails, and any changes made are reverted to maintain consistency in the system. As a result, a substantial amount of computer resources and processing time can be wasted on these failed transactions before it is determined that the transaction has timed out or failed.

SUMMARY

According to one embodiment of the present invention, a transaction request is received at a transaction processing monitor (TPM) from a requesting entity. The transaction request is associated with a plurality of current tags, one of which specifies a timeout value. The TPM identifies historical transactions corresponding to the transaction request, and determines a plurality of historical tags associated with the historical transactions, wherein one of the historical tags specifies a historical minimum execution time. If the TPM determines that the predicted execution time for the transaction request exceeds the timeout value, the current tags are updated to reflect that determination, and an indication that the transaction request failed to execute is returned with the current tags.

DETAILED DESCRIPTION

Transaction processing is a form of computer processing where work is divided into transactions. Typically, transactions are indivisible operations, where the entire transaction must either succeed or fail. Distributed transaction processing involves executing a transaction across multiple devices, referred to herein as transaction processing monitors (TPMs). In a complex transaction processing system, a transaction can often go through multiple TPMs, accessing multiple resources (e.g., databases) along the way. These TPMs could be spread across wide geographies and operating in a cloud environment. As the number of TPMs and resources required increases, the possible failure points likewise increases. Common failure points include network delays while the transaction is traversing the system, dispatcher delays before the transaction can be sent to a particular TPM to execute it, scheduler delays where a TPM is overloaded and the transaction sits in an input queue for too long, execution delays where a TPM is simply executing slowly, and unavailability of a dependent resource.

Generally, transactions are associated with a timeout value. If the transaction suffers delays, e.g., waiting for a resource or TPM to become available, the elapsed time since the transaction was initiated may exceed this timeout. When that happens, the transaction fails, and any changes made are reverted to maintain consistency in the system. Large amounts of computer resources and processing time can be wasted on these failed transactions before it is determined that the transaction has timed out or failed. The present disclosure therefore presents techniques to predetermine a transaction's outcome based on its artifacts in a transaction processing environment, and thereby avoid wasting limited transaction processing system resources.

Figure 1:
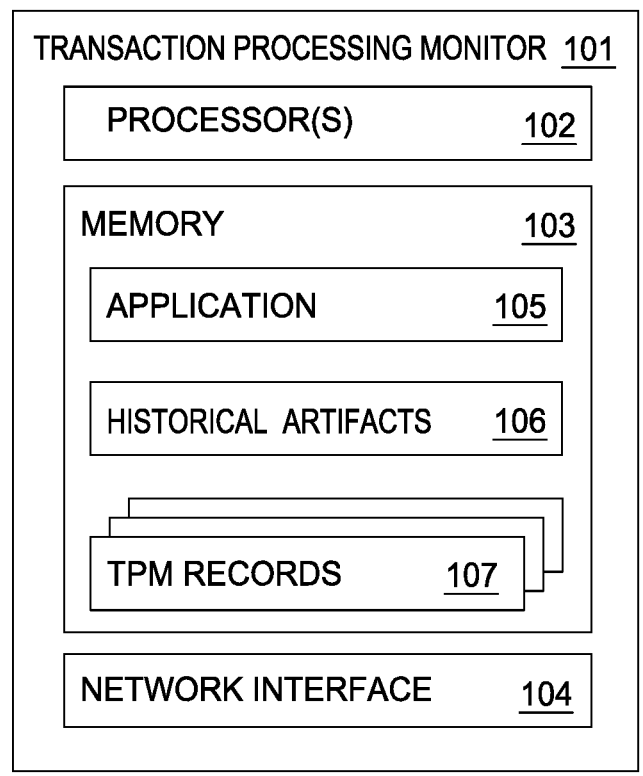
FIG. 1 is a block diagram illustrating a TPM capable of implementing one embodiment discussed herein.

With reference now to FIG. 1, a TPM 101 capable of implementing one embodiment of the present discussion is illustrated. As shown, TPM 101 includes one or more Processor(s) 102, Memory 103, and Network Interface 106. The Processor 102 may be any processor capable of performing the functions described herein. Memory 103 contains Application 105, Historical Artifacts 106, and TPM Records 107. Although in the pictured embodiment Memory 103 is shown as a single entity, Memory 103 may include one or more memory devices having blocks of memory associated with physical addresses, such as random access memory (RAM), read only memory (ROM), flash memory or other types of volatile and/or non-volatile memory. As is discussed in more detail below, TPM 101 is generally configured to receive transaction requests through Network Interface 104 and execute them using Application 105. Prior to executing a transaction request, TPM 101 may be configured to compare the tags associated with the transaction request to Historical Artifacts 106 in order to predict whether the transaction will fail. If so, TPM 101 will immediately return failure rather than waste time or computing resources executing a doomed request.

Additionally, Memory 103 may contain one or more TPM Records 107 which each contain data about a respective neighboring TPM. For example, each TPM Record 107 may contain information about a minimum execution time and recent execution times at a neighboring TPM. Each TPM Record 107 may further contain information about whether resources attached to the neighboring TPM, such as a database, are currently available. Additionally, TPM Records 107 can include data about workload at neighboring TPMs. In some embodiments, TPM 101 may only be able to execute a portion of a given transaction request (e.g., due to lacking specific resources needed to execute the entirety of the transaction request). In that case, TPM 101 may be configured to refer to TPM Records 107 to select a neighboring TPM that is capable of continuing the execution.

Figure 2:
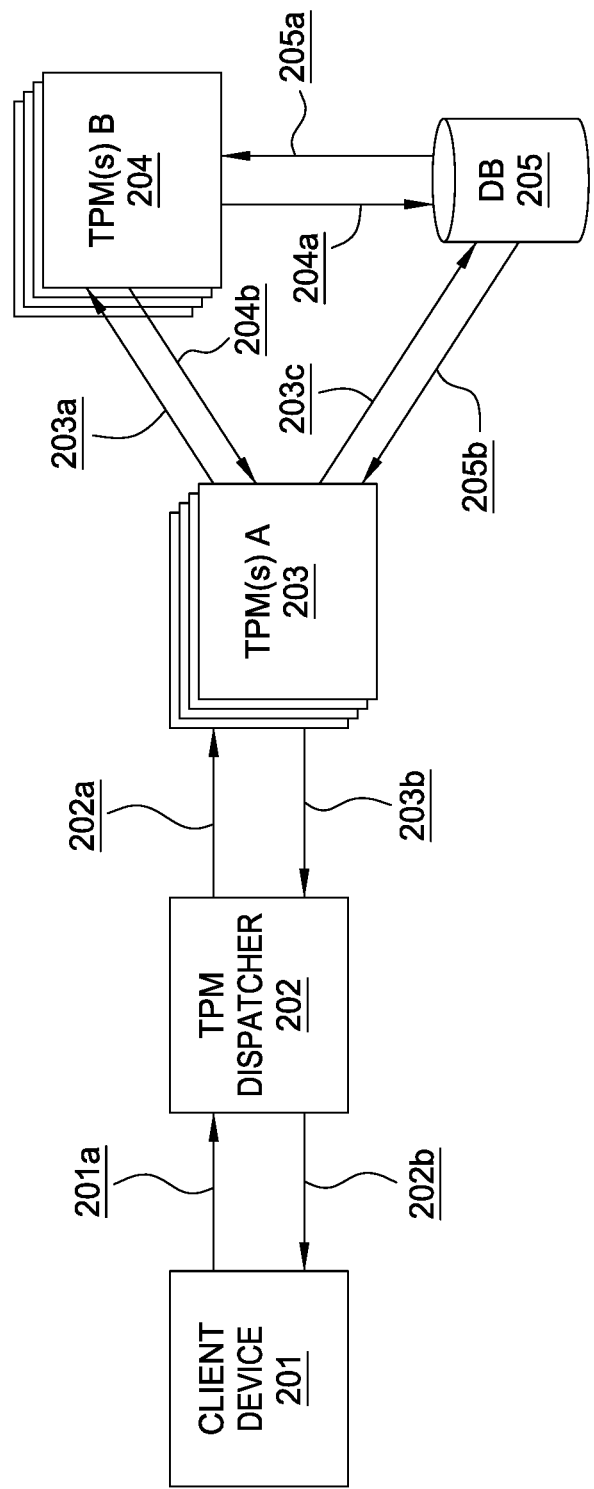
FIG. 2 illustrates an environment comprising multiple TPMs that is capable of implementing one embodiment discussed herein.

FIG. 2 is a block diagram of an environment capable of implementing one embodiment of the present disclosure. In the depicted embodiment, a Client Device 201 initiates a transaction by sending a transaction request along communication link 201a to a TPM Dispatcher 202. In some embodiments, TPM Dispatcher 202 is a discrete module that is designed to receive transaction requests and select an appropriate TPM to dispatch them to, such as TPM A 203. In such an embodiment, TPM Dispatcher 202 is generally configured to receive a transaction request from Client Device 201, determine a best available TPM to execute the transaction request, and dispatch the transaction request to that best available TPM.

TPM Dispatcher 202 may select the best TPM based on a variety of factors, including current workload of each TPM, a hash-based load-balancer, or any other method of dispatching requests. In one embodiment, TPM Dispatcher 202 maintains a record for each TPM in the system, where each record contains information about each TPM. For example, each record might contain a minimum historical execution time for comparable requests sent to that TPM, as well as a last execution time for the most recent comparable transaction that was dispatched there. In some embodiments, TPM Dispatcher 202 is configured to select a best TPM based on these records, e.g., TPM Dispatcher 202 may select the TPM that has the lowest minimum execution time or the fastest last execution time. In some embodiments, one of the TPMs within the transaction processing environment is configured to also act as TPM Dispatcher 202. In these embodiments, TPM Dispatcher 202 itself is capable of executing at least a portion of a transaction request, and may then select a TPM to continue execution rather than begin execution.

In some embodiments, transaction requests are associated with a timeout value that indicates how much time remains until the transaction request times out and fails. For instance, such a timeout value could be set by the Client Device 201 or an application therein. For example, an application running on the Client Device 201 that generates the transaction request may require a response within five seconds, and could specify a timeout value of "5" in a timeout field of the transaction request before sending the transaction request to the TPM Dispatcher 202. In other embodiments, transaction requests arrive at TPM Dispatcher 202 without a specified timeout value, and TPM Dispatcher 202 determines a timeout value to associate with the transaction request. For example, TPM Dispatcher 202 may be configured to associate a particular timeout value with all requests that originate from a particular Client Device 201, a defined group of clients, a type of client, a location of the Client Device 201, or any other method of grouping client devices. Additionally or alternatively, TPM Dispatcher 202 may be configured to determine an appropriate timeout value based on the type of transaction contemplated by the transaction request, the current workload of the system or particular TPMs, or any other method of deciding an appropriate timeout value for a particular transaction request.

In some embodiments, TPM Dispatcher 202 is configured to verify that sufficient time remains to assure successful execution of the transaction request before forwarding it to TPM(s) A 203. In embodiments where TPM Dispatcher 202 is itself a TPM capable of executing the request, TPM Dispatcher 202 may likewise be configured to verify that sufficient time remains to execute the transaction before it begins execution. For example, after determining the associated timeout value, TPM Dispatcher 202 can verify that the minimum execution time of the system is faster than the timeout value. If the timeout value is less than the minimum execution time, TPM Dispatcher 202 can immediately return the failure to the Client Device 201. In another embodiment, TPM Dispatcher may be configured to select a best available TPM based on, e.g., the last execution time of each TPM, and to verify that the minimum execution time of the best available TPM is less than the timeout value.

In some embodiments, TPM Dispatcher 202 verifies that sufficient time remains by using a predicted execution time. The predicted execution time may be based off of any number of factors, including the current workload of the system, the minimum execution time at one or more TPMs, the most recent execution time at one or more TPMs, or any other factors. For example, the TPM Dispatcher 202 may determine that the most recent execution time for a TPM was five seconds. Rather than simply fail the transaction because the timeout value is 4.5 seconds, the TPM Dispatcher 202 may instead estimate that execution will take approximately five seconds rather than exactly five seconds. The range of acceptable variation could be determined with a predefined amount of time, e.g., one second, or a predefined percentage, e.g., within 10%. Additionally or alternatively, the range of acceptable times could be based on the standard deviation of execution times at the particular TPM. In this example, the TPM Dispatcher 202 may determine that the last execution time was five seconds, and decide that the predicted execution time is between four and six seconds. Thus, the transaction request may be executed or forwarded to a TPM even though the last execution time is greater than the timeout value.

Using historical tags to predetermine transaction failure avoids wasting scarce time and computing resources of the transaction processing system and the client. For example, suppose a transaction request has a timeout value of five seconds and TPM Dispatcher 202 determines that it will take at least six seconds to execute it. The transaction request can be immediately returned, rather than attempting to execute it. In prior systems without historical transaction tags and artifacts, the transaction processing system would begin executing the request and would not return failure until five seconds had elapsed, even though the request was doomed to fail. In addition to the benefits to the transaction processing system, this embodiment is beneficial for Client Device 201 because it receives the failed request sooner, and can generate a new request sooner in order to attempt execution again.

In some embodiments, if sufficient time remains to execute the request, TPM Dispatcher 202 is configured to update the tags associated with the request before dispatching it. For example, TPM Dispatcher 202 can calculate how much time has elapsed since the transaction request was sent by Client Device 201. TPM Dispatcher 202 can then update the timeout value associated with the transaction request by decreasing the timeout value by the elapsed time. In some embodiments, TPM Dispatcher 202 may further verify that sufficient time remains for execution before sending the transaction request to a TPM. Thus, TPM Dispatcher 202 may update and verify the timeout twice, once upon receiving the request and once just before dispatching it. As discussed below, each TPM in the system may perform a similar verification and update before passing the transaction request along, upon receiving the request, or both.

Although FIG. 2 illustrates a plurality of TPMs A 203, in some embodiments there is only a single TPM A 203. In one embodiment with a plurality of TPMs A 203, each TPM A 203 is a clone capable of executing the transaction request, and TPM Dispatcher 202 may select a TPM A 203 to execute the request based on workload, last execution time, minimum execution time, or any other method. Each TPM A 203 may have identical hardware to the other TPM A 203, or one or more TPM A 203 may have faster hardware, more memory, or may vary in some other way. Additionally, each TPM A 203 may be a discrete device, or each may each operate as independent discrete modules on a single device or distributed across multiple devices. TPM A 203 and TPM Dispatcher 202 may be communicatively linked in any manner. In many embodiments, there are unavoidable and unpredictable transmission delays while a transaction request traverses the various links between TPMs and the TPM Dispatcher 202. Additionally, each TPM may have an input queue where incoming transaction requests are queued to be executed, and further delays could occur while the transaction is waiting to be scheduled and executed.

In a preferred embodiment, before beginning execution, TPM A 203 (and all other TPMs that receive a request) verifies that it is possible for the transaction request to be completed successfully. To do so, TPM A 203 may compare the tags associated with the transaction request to its own set of historical artifacts or tags. For example, in one embodiment, TPM A 203 compares the timeout value associated with the transaction with the historical minimum execution time for TPM A 203. After each transaction request is completed, TPM A 203 compares the updated tags comprising the execution time with its own historical minimum execution time, and updates its own historical tags or artifacts if the transaction was completed faster than the historical minimum time. If the historical minimum execution time is greater than the current timeout value, the transaction will not begin execution. In some embodiments, before returning a failure notice, TPM A 203 updates the tags associated with the transaction request to indicate why it failed, for example the tags may be updated to reflect that the transaction would take too long to complete at the particular TPM A 203. TPM Dispatcher 202 may use this data to adjust its routing patterns, and thereby prevent repeated failures because of timeout. For example, TPM Dispatcher 202 may send a future transaction request to a different TPM A 203 in the plurality of TPM(s) A 203.

In one embodiment, the current transaction tags contain information about which resources will be required for successful completion, for example a database that will be accessed during execution. In this embodiment, TPM A 203 may reject the transaction because it knows that the indicated resource is unavailable. In order to maintain an updated status of dependent resources, TPM A 203 uses updated tags associated with completed (or failed) transactions that are being returned to the Client Device 201, as is discussed in more detail below. In this way, TPM A 203 may recognize that a required resource is unavailable before the execution actually requires it to be accessed. This enables more efficient use of the transaction processing system. If a dependent resource is unavailable, TPM A 203 will update the tags associated with the transaction and return it to TPM Dispatcher 202. In this embodiment, TPM Dispatcher 202 will update its own historical records based on these updated tags before returning the failed request to the Client Device 201. For example, TPM Dispatcher 202 may store an indication that the particular resource is currently unavailable. If a transaction request arrives that requires that resource, TPM Dispatcher 202 can immediately return failure based on this data. In this embodiment, it may be necessary to periodically send a dummy request to see if the unavailable resource has become available again. The majority of status messages, however, are sent through the tags associated with each transaction request and response, which greatly reduces the amount of dummy traffic traversing the transaction processing system.

In some embodiments, and particularly in complex transaction processing environments, a particular transaction may be sent across multiple TPMs during execution. For example, as illustrated in FIG. 2, TPM A 203 and TPM B 204 may run different applications, and each may be incapable of executing an entire transaction request alone. In such an embodiment, TPM A 203 may begin execution of a transaction, and during execution determine that it has reached a point that it cannot continue to execute the transaction. TPM A 203 may then forward the transaction to one of the plurality of TPM(s) B 204 to be completed. TPM A 203 may select one TPM B 204 in much the same way that TPM Dispatcher 202 selects one of the plurality of TPM(s) A 203, e.g., by comparing historical minimum execution times or last execution times for each TPM B 204. Additionally or alternatively, TPM A 203 may be capable of the entire execution, but may not have access to a required resource such as Database 205, for example because link 203c is unavailable. This would require that the transaction be sent to TPM B 204. Of course, in some embodiments TPM A 203 may be fully capable of executing and completing the request, and may not need to forward it to another TPM at all.

In a preferred embodiment, before continuing or beginning execution of a transaction request, TPM B 204 updates and verifies the timeout value as discussed above. For example, TPM B 204 will determine how much time remains until the request times out, and compare this value to TPM B 204's minimum execution time. TPM B 204 may also compare other data in the transaction's tags, such as required resources, to historical tags and artifacts stored by TPM B 204. Additionally, in some embodiments TPM B 204 may be required to send the transaction to yet another TPM to continue execution, and that subsequent TPM would perform the same updating and verification of the transaction's tags before continuing execution. In this way, the timeout value and other tags associated with a given transaction are dynamically and repeatedly updated at every stage of execution, and each TPM independently determines whether the transaction can be completed successfully. If at any point it is determined that the transaction is doomed to fail, it will be returned immediately, thus saving time and system resources.

As will be discussed in more detail below in reference to FIG. 3, in one embodiment transaction tags are updated and are useful even after a transaction is completed successfully (or is returned because of a predicted failure). For example, if TPM B 204 successfully completes execution, it may update the tags of the transaction to indicate how long it took to execute it, which TPM executed it, a reason for failure, and the like. TPM B 204 will also update its own records indicating how long this most recent execution took, and will update its previous minimum execution time if it was faster. When the transaction is returned to TPM A 203, TPM A 203 can use these tags to update its own records similarly, as will TPM Dispatcher 202. If the transaction failed, each TPM A 203 and TPM Dispatcher 202 may update its artifacts to indicate that a required resource is down, that a particular TPM could not finish in time, or any other relevant information. Finally, the tags can be stripped by TPM Dispatcher 202, and the response can be sent to the Client Device 201.

Figure 3:
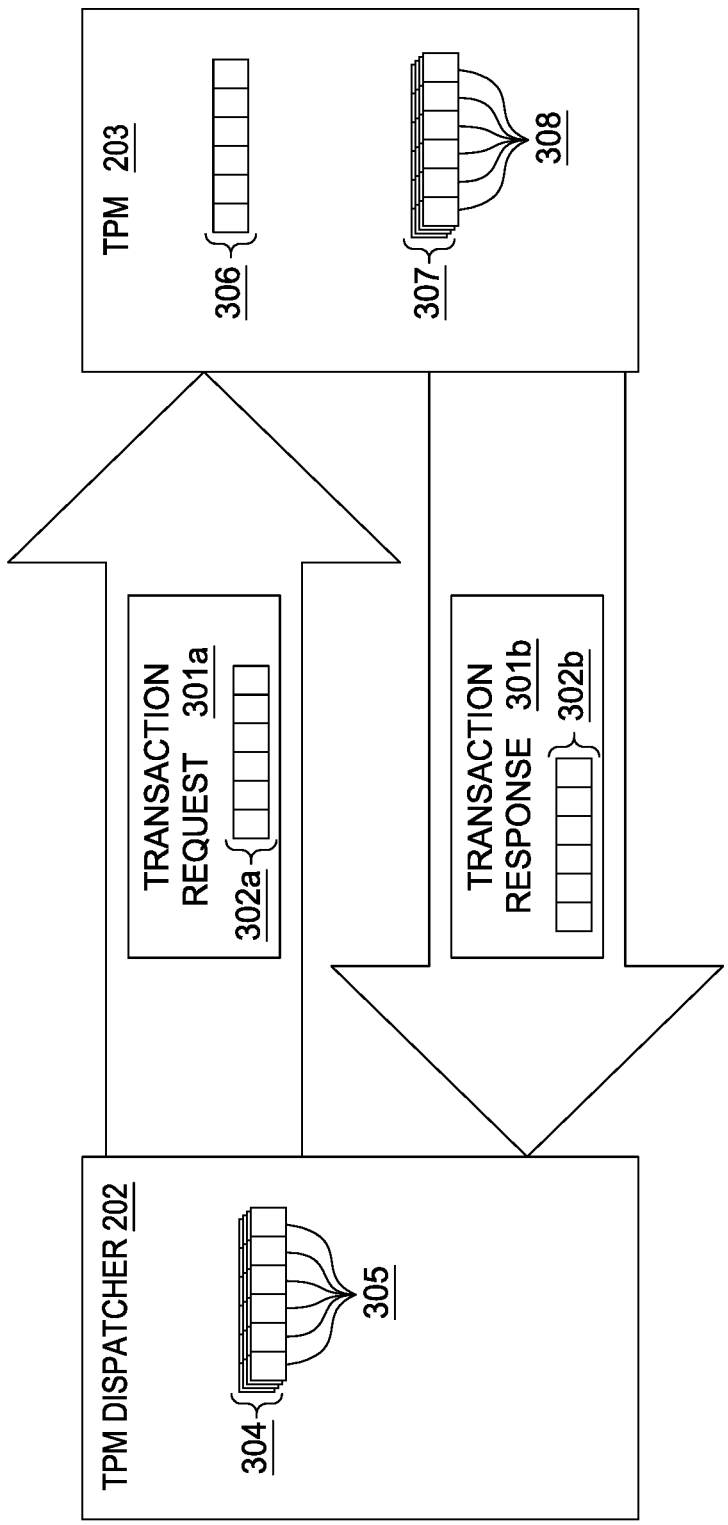
FIG. 3 is a block diagram illustrating a transaction request and TPM, and the historical tags and artifacts associated with one embodiment discussed herein.

Turning now to FIG. 3, a more detailed illustration of one embodiment of the information stored by each TPM and carried by each transaction request is shown. In the illustrated embodiment, TPM Dispatcher 202 maintains a plurality of Records 304. These Records 304 may also be referred to as historical tags or transaction artifacts. Each Record 304 contains information about a particular TPM 203 in the transaction processing system. Each Record 304 has various Fields 305, including a name or identifier of the respective TPM 203, a minimum historical execution time for the TPM 203, the last execution time, and other workload information. Records 304 may also contain information about the availability or workload of dependent resources for various transactions. In some embodiments, each TPM 203 maintains a similar plurality of Records 307 in order to facilitate routing decisions. In this way, TPM 203 can intelligently route transactions based on the workload, execution times, and availability of neighboring TPMs. Each TPM 203 also maintains a single Record 306 which maintains the same information as its corresponding Record 304 in TPM Dispatcher 202. For example, whenever TPM 203 updates its own Record 306, e.g., by updating the last execution time, TPM Dispatcher 202 will update its corresponding Record 304 when the Transaction Response 301b reaches it.

In some embodiments, the transaction processing system is capable of handling multiple types of transactions. In such an embodiment, the transaction Records 304, 306, and 307 may further contain data about the type(s) of transaction it refers to, the type(s) of transaction the respective TPM is capable of, or similar information. In this way, the TPM Dispatcher 202 and subsequent TPMs can be sure that the data being used to predict failure is accurate based on the type of transaction. For example, if transactions of type A generally take five seconds to execute, and transactions of type B require ten seconds to execute, it is vital that the records are kept distinct for each type of transaction. Otherwise, transactions of type B would almost certainly be allowed to continue execution regardless of how much time remains because transactions of type A have lowered the minimum execution time. Similarly, the last execution time would be rendered useless, as it might apply to an entirely different type of transaction.

In the illustrated embodiment, each Transaction Request 301a is associated with a series of tags 302a. As discussed above, these tags include information like the name of the transaction, the associated Client Device 201, a timeout value, required resources, and may include a type of the transaction. These tags 302a are dynamically and repeatedly updated at every stage of execution in order to predict whether the transaction will fail or can be completed successfully. After successful execution, TPM 203 updates the transaction tags 302a and attaches them to the corresponding Transaction Response 301b as tags 302b. Similarly, after determining that a transaction will fail, TPM 203 updates the tags 302a to indicate why the transaction is being returned, and attaches them to the response indicating failure. These updated tags 302b reflect the time it took to execute the transaction and other workload and system resource related information. For example, tags 302b may contain an indication of whether a particular resource is available.

In a particular embodiment, TPM 203 sends Transaction Response 301b to the entity that sent the corresponding Transaction Request 301a to it. For example, if TPM 203 received Transaction Request 301a from another TPM, the Transaction Response 301b will be sent to that TPM. Likewise, if TPM 203 received the Transaction Request 301a directly from TPM Dispatcher 202, it will send the Transaction Response 301b to TPM Dispatcher 202. In this way, Transaction Response 301b is forwarded along the chain of TPMs that executed it, so that each participating TPM 203 can update its personal Record 306, as well as its plurality of Records 307. When the Transaction Response 301b reaches TPM Dispatcher 202, it similarly updates its records 304 based on the updated tags 302b. Finally, Transaction Response 301b is returned to Client Device 201. In a preferred embodiment, TPM Dispatcher 202 strips the updated tags 302b before returning the Transaction Response 301b, but TPM Dispatcher 202 may also strip only some of the tags 302b, or may leave them all attached to the Transaction Response 301b.

Figure 4:
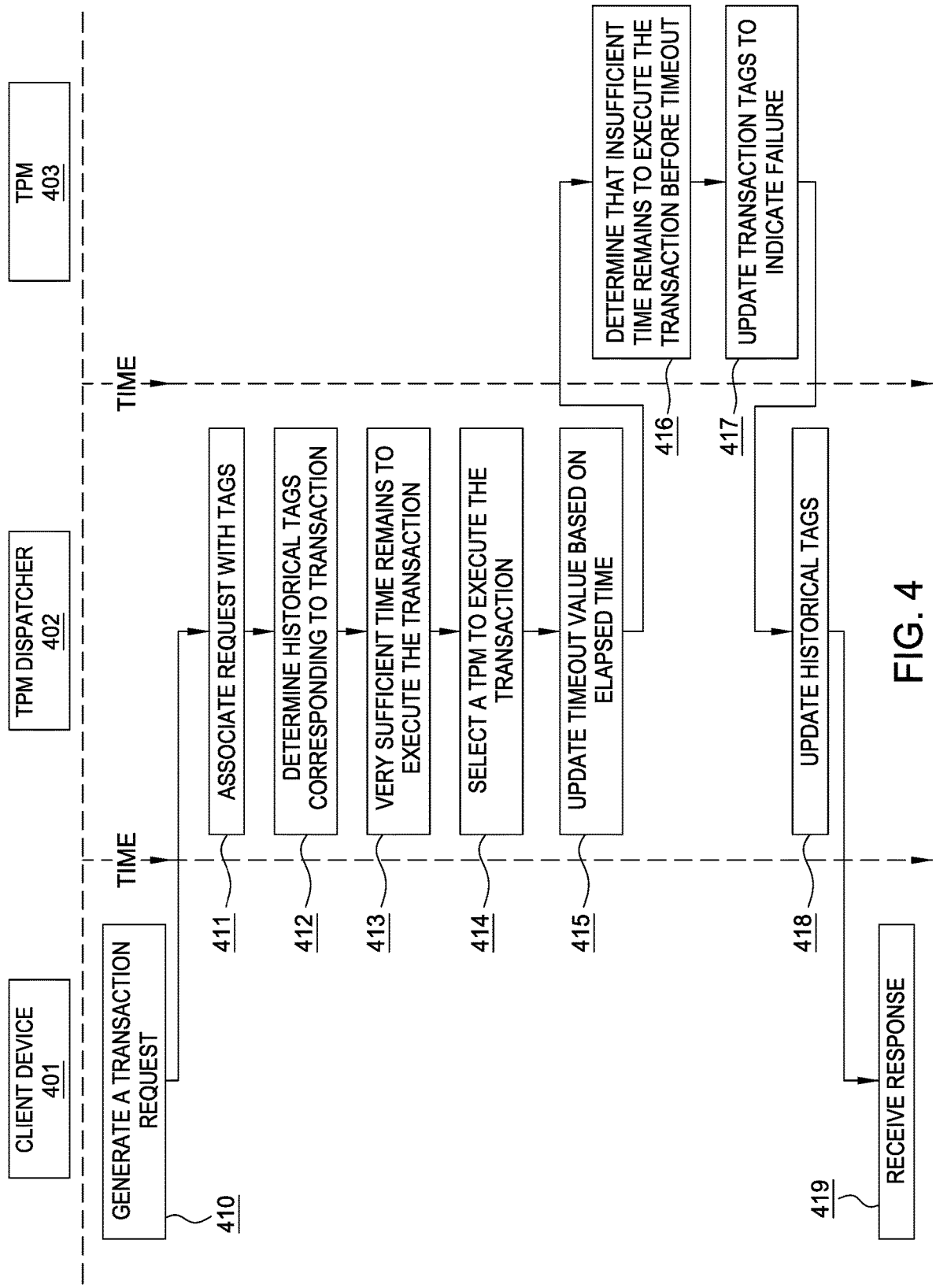
FIG. 4 is a flow diagram illustrating a method of predicting transaction failure, according to one embodiment described herein.

FIG. 4 is a flow diagram illustrating an exemplary sequence of events and the entities that complete each operation in one embodiment. At block 410, Client Device 401 or an application thereon generates a transaction request. Client Device 401 sends this request to TPM Dispatcher 402, and at block 411 TPM Dispatcher 402 associates the request with tags, as discussed above. At block 412, TPM Dispatcher 402 determines a set of historical tags corresponding to the transaction. For example, if the transaction processing system is capable of executing multiple types of transactions, TPM Dispatcher 402 will only use tags relevant to this particular type of transaction in order to route the request. At block 413, TPM Dispatcher 402 verifies that sufficient time remains to execute the transaction. In the same block, TPM Dispatcher 402 may also verify that any required resources are available. At block 414, TPM Dispatcher 402 selects a TPM to execute the transaction, based on the current tags and the determined historical tags. TPM Dispatcher 402 then updates the timeout value based on elapsed time at block 415, and sends the request to the selected TPM.

At block 416, TPM 403 begins operation on the request and determines that insufficient time remains to execute the transaction before timeout. Additionally or alternatively, TPM 403 may determine that a required resource is unavailable. TPM 403 then updates the transaction tags to indicate the failure at block 417. These updated tags preferably not only indicate that the request will fail, but also include data about why the request would fail. At block 418, TPM Dispatcher 402 updates its own historical tags with the data provided in the tags by TPM 403. Finally, at block 419, Client Device 401 receives the response indicating that the transaction has failed to execute, and can begin preparing another transaction request to attempt again. Although not illustrated, TPM 403 could of course determine that the transaction request can be completed successfully, and proceed to execute the request. Similarly, TPM 403 may forward the request to another TPM in the process of execution, and that TPM would complete similar steps in execution.

Figure 5:
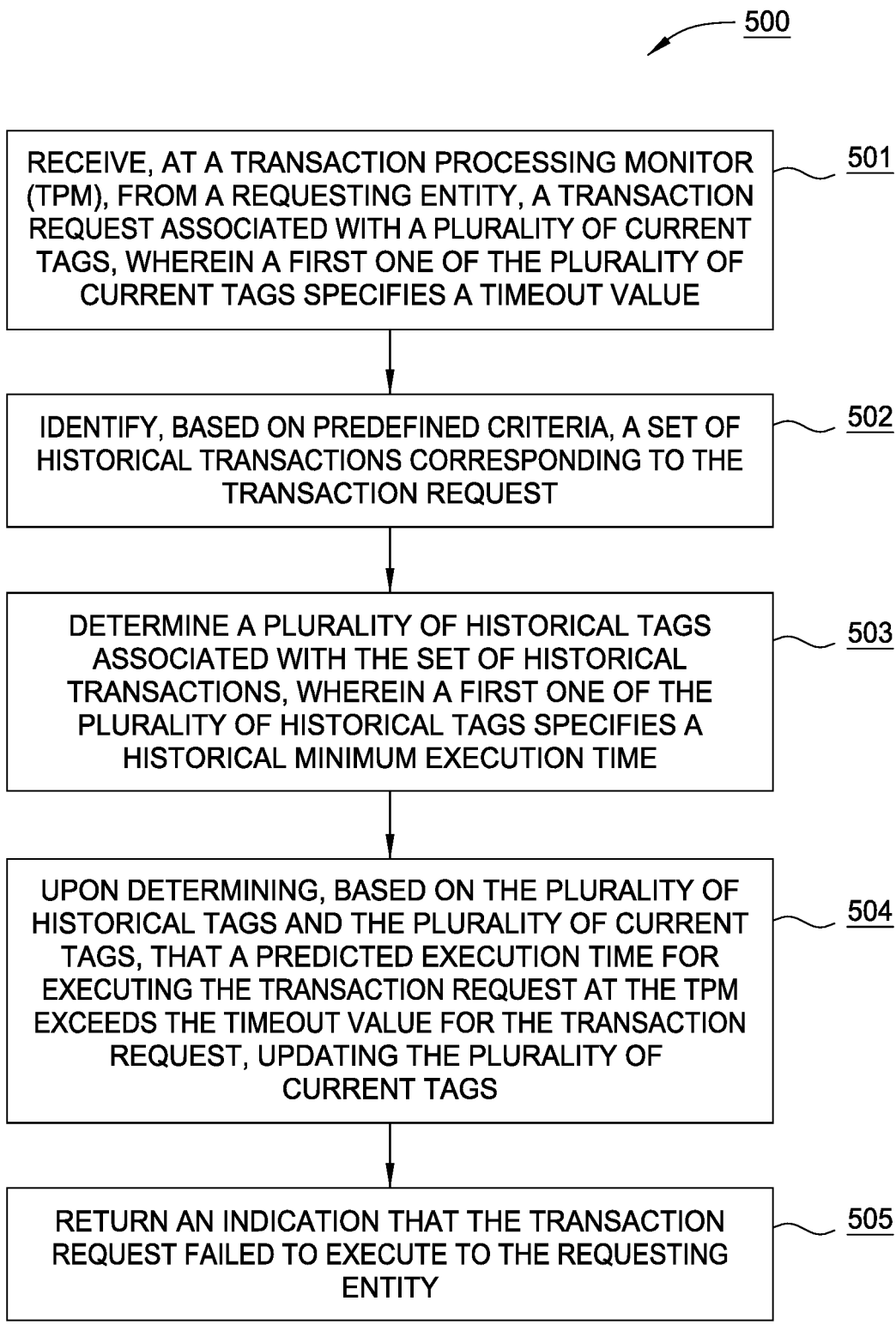
FIG. 5 is a flow diagram illustrating a method of predicting transaction failure based on a predicted execution time exceeding a timeout value for the transaction, according to one embodiment described herein.

FIG. 5 is a flow diagram illustrating a method 500 of implementing one embodiment of the present disclosure. The method begins at block 501 where a TPM receives, from a requesting entity, a transaction request associated with a plurality of current tags, wherein a first one of the plurality of current tags specifies a timeout value. At block 502 the TPM identifies, based on predefined criteria, a set of historical transactions corresponding to the transaction request. At block 503, the TPM determines a plurality of historical tags associated with the set of historical transactions, wherein a first one of the plurality of historical tags specifies a historical minimum execution time. Upon determining, based on the plurality of historical tags and the plurality of current tags, that a predicted execution time for executing the transaction request at the TPM exceeds the timeout value for the transaction request, the TPM updates the plurality of current tags at block 504. Finally, at block 505, the TPM returns an indication that the transaction request failed to execute to the requesting entity.

Figure 6:
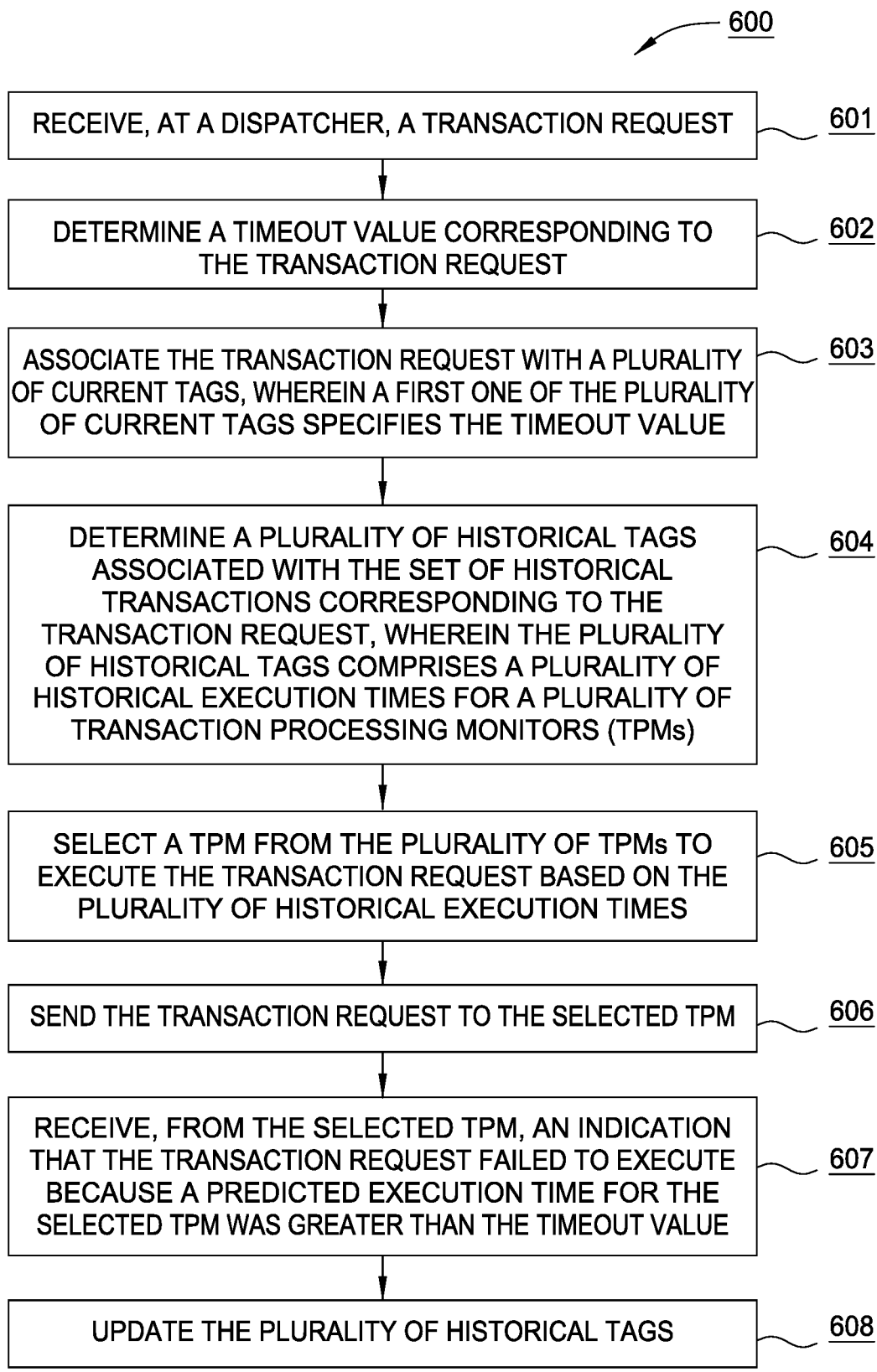
FIG. 6 is a flow diagram illustrating a method of managing transactions in a transaction processing environment using tags, according to one embodiment described herein.

FIG. 6 is a flow diagram illustrating a method 600 of implementing one embodiment of the present disclosure. The method begins at block 601 when a dispatcher receives a transaction request. At block 602, the dispatcher determines a timeout value corresponding to the transaction request. In some embodiments, the dispatcher determining the timeout value comprises determining a timeout value that a client device associated with the transaction request itself. In other embodiments, the client device did not associate the request with a timeout value, and the dispatcher determines a timeout value on its own. At block 603, the dispatcher associates the transaction request with a plurality of current tags, wherein a first one of the plurality of current tags specifies the timeout value. At block 604, the dispatcher determines a plurality of historical tags associated with a set of historical transactions corresponding to the transaction request, wherein the plurality of historical tags comprises a plurality of historical execution times for a plurality of TPMs. The dispatcher selects a TPM from the plurality of TPMs to execute the transaction request based on the plurality of historical execution times at block 605. At block 606, the dispatcher sends the transaction request to the selected TPM. At block 607, the dispatcher receives, from the selected TPM, an indication that the transaction request failed to execute because a predicted execution time for the selected TPM was greater than the timeout value. Finally, the method 600 ends when the dispatcher updates the plurality of historical tags at block 608.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., executing a transaction request in a distributed transaction processing system) or related data available in the cloud. For example, the transaction processing system could execute on a computing system in the cloud and each TPM could execute in the cloud. In such a case, the TPMs could execute transaction requests in a cloud computing system, and store transaction tags, historical artifacts, and related data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
 receiving, by a dispatcher from a client device, a first transaction request at a first time;
 determining, by the dispatcher, a first timeout value corresponding to the first transaction request;
 associating, by the dispatcher, the first transaction request with a first plurality of current tags, wherein one of the first plurality of current tags specifies the first timeout value;
 determining, by the dispatcher, a plurality of historical tags associated with a set of historical transactions corresponding to the first transaction request, wherein each historical tag of the plurality of historical tags comprises (i) a plurality of historical execution times for a plurality of transaction processing monitors (TPMs) and (ii) a last execution time for each of the plurality of TPMs;

selecting, by the dispatcher, a first TPM from the plurality of TPMs to execute the first transaction request based on the plurality of historical tags, wherein selecting the first TPM is based on determining that (i) the first TPM has a lowest last execution time among the plurality of TPMs and (ii) a historical minimum execution time associated with the first TPM is less than the first timeout value;

sending, by the dispatcher, the first transaction request to the selected first TPM for execution, wherein the first TPM determines a predicted execution time of the first transaction request, based on the lowest last execution time, the historical minimum execution time, and the first plurality of current tags;

receiving, by the dispatcher from the first TPM, one of a transaction response that the first TPM completed the execution or an indication that the first transaction request failed to execute, in response to determining that a predicted execution time for the first TPM was greater than the first timeout value, wherein the indication is received, prior to an expiration of the first timeout value, and the indication returns one or more updates to the first plurality of current tags associated with the first transaction request; and responsive to receiving the indication, updating, by the dispatcher, the plurality of historical tags.

2. The method of claim 1, wherein determining the first timeout value comprises determining a value specified by the first transaction request.

3. The method of claim 1, wherein:
the first transaction request does not specify the first timeout value; and
the first timeout value is determined by the dispatcher.

4. The method of claim 3, wherein the first timeout value is further determined based on a type of transaction associated with the first transaction request.

5. The method of claim 1, further comprising:
receiving, by the dispatcher, a second transaction request;
associating, by the dispatcher, the second transaction request with a second plurality of current tags, wherein one of the second plurality of current tags specifies a second timeout value; and
upon determining, by the dispatcher, that a predicted execution time for the second transaction request exceeds the second timeout value, returning, by the dispatcher, an indication that the second transaction request failed to execute.

6. The method of claim 1, further comprising:
receiving, by the dispatcher, a response from the first TPM, wherein the response corresponds to a second transaction request and wherein the response is associated with a plurality of response tags;
updating, by the dispatcher, the plurality of historical tags based on the plurality of response tags; and
returning, by the dispatcher, the response to an entity that sent the second transaction request.

7. The method of claim 6, wherein:
the plurality of response tags comprise a new execution time; and
updating the plurality of historical tags comprises updating the last execution time of the first TPM based on the new execution time.

8. The method of claim 7, wherein updating the plurality of historical tags further comprises:
determining that the new execution time is faster than the historical minimum execution time of the first TPM; and
updating the historical minimum execution time based on the new execution time.

9. The method of claim 1, further comprising:
receiving, by the dispatcher, from a requesting entity, a second transaction request;
associating, by the dispatcher, the second transaction request with a second plurality of current tags, wherein one of the second plurality of current tags specifies a system resource that is required to execute the second transaction request; and
upon determining, by the dispatcher, that the system resource is unavailable, returning, by the dispatcher, an indication that the second transaction request failed to execute to the requesting entity.

10. The method of claim 1, further comprising:
receiving, by the dispatcher, the first transaction request at a subsequent second time;
selecting, by the dispatcher, a second TPM to execute the first transaction request, wherein the second TPM is different from the first TPM; and
sending, by the dispatcher, the first transaction request to the second TPM.

11. The method of claim 1, further comprising:
prior to selecting the first TPM, executing, by the dispatcher, the first transaction request, wherein executing the first transaction request comprises:
beginning to execute the first transaction request; and
determining that the first transaction request will need to be sent to another TPM to finish execution.

12. A computer program product comprising a computer-readable storage medium having computer-readable program code embodied therewith, the computer-readable program code executable by one or more computer processors to perform an operation, the operation comprising:
receiving, by a dispatcher from a client device, a first transaction request at a first time;
determining, by the dispatcher, a first timeout value corresponding to the first transaction request;
associating, by the dispatcher, the first transaction request with a first plurality of current tags, wherein one of the first plurality of current tags specifies the first timeout value;
determining, by the dispatcher, a plurality of historical tags associated with a set of historical transactions corresponding to the first transaction request, wherein each historical tag of the plurality of historical tags comprises (i) a plurality of historical execution times for a plurality of transaction processing monitors (TPMs) and (ii) a last execution time for each of the plurality of TPMs;
selecting, by the dispatcher, a first TPM from the plurality of TPMs to execute the first transaction request based on the plurality of historical tags, wherein selecting the first TPM is based on determining that (i) the first TPM has a lowest last execution time among the plurality of TPMs and (ii) a historical minimum execution time associated with the first TPM is less than the first timeout value;
sending, by the dispatcher, the first transaction request to the selected first TPM for execution, wherein the first TPM determines a predicted execution time of the first transaction request, based on the lowest last execution time, the historical minimum execution time, and the first plurality of current tags;

receiving, by the dispatcher from the first TPM, one of a transaction response that the first TPM completed the execution or an indication that the first transaction request failed to execute, in response to determining that a predicted execution time for the first TPM was greater than the first timeout value, wherein the indication is received, prior to an expiration of the first timeout value, and the indication returns one or more updates to the first plurality of current tags associated with the first transaction request; and responsive to receiving the indication, updating, by the dispatcher, the plurality of historical tags.

13. The computer program product of claim 12, wherein determining the first timeout value comprises determining a value specified by the first transaction request.

14. The computer program product of claim 12, wherein:
the first transaction request does not specify the first timeout value; and
the first timeout value is determined by the dispatcher.

15. The computer program product of claim 14, wherein the first timeout value is further determined based on a type of transaction associated with the first transaction request.

16. The computer program product of claim 12, the operation further comprising:
receiving, by the dispatcher, a second transaction request;
associating, by the dispatcher, the second transaction request with a second plurality of current tags, wherein one of the second plurality of current tags specifies a second timeout value; and
upon determining, by the dispatcher, that a predicted execution time for the second transaction request exceeds the second timeout value, returning, by the dispatcher, an indication that the second transaction request failed to execute.

17. A transaction processing monitor (TPM) dispatcher comprising:
a computer processor; and
a memory containing a program, which when executed by the computer processor, performs an operation, the operation comprising:
receiving a first transaction request from a client device;
determining a first timeout value corresponding to the first transaction request;
associating the first transaction request with a first plurality of current tags, wherein one of the first plurality of current tags specifies the first timeout value;
determining a plurality of historical tags associated with a set of historical transactions corresponding to the first transaction request, wherein each historical tag of the plurality of historical tags comprises (i) a plurality of historical execution times for a plurality of transaction processing monitors (TPMs) and (ii) a last execution time for each of the plurality of TPMs;
selecting a first TPM from the plurality of TPMs to execute the first transaction request based on the plurality of historical tags, wherein selecting the first TPM is based on determining that (i) the first TPM has a lowest last execution time among the plurality of TPMs and (ii) a historical minimum execution time associated with the first TPM is less than the first timeout value;
sending the first transaction request to the selected first TPM for execution, wherein the first TPM determines a predicted execution time of the first transaction request, based on the lowest last execution time, the historical minimum execution time, and the first plurality of current tags;
receiving, from the first TPM, one of a transaction response that the first TPM completed the execution or an indication that the first transaction request failed to execute, in response to determining that a predicted execution time for the first TPM was greater than the first timeout value, wherein the indication is received, prior to an expiration of the first timeout value, and the indication returns one or more updates to the first plurality of current tags associated with the first transaction request; and
responsive to receiving the indication, updating the plurality of historical tags.

18. The TPM dispatcher of claim 17, wherein determining the first timeout value comprises determining a value specified by the first transaction request.

19. The TPM dispatcher of claim 17, wherein:
the first transaction request does not specify the first timeout value; and
the first timeout value is determined by the TPM dispatcher.

20. The TPM dispatcher of claim 19, wherein the first timeout value is further determined based on a type of transaction associated with the first transaction request.

* * * * *